United States Patent
MacGregor et al.

(10) Patent No.: US 7,093,817 B2
(45) Date of Patent: Aug. 22, 2006

(54) FLOW CONTROL ASSEMBLIES HAVING INTEGRALLY FORMED SHAPE MEMORY ALLOY ACTUATORS

(75) Inventors: Roderick MacGregor, Antioch, CA (US); Andrei Szilagyi, Danville, CA (US); Peter Emery Von Behrens, Antioch, CA (US)

(73) Assignee: Alfmeier Prazision AG Baugruppen Und Systemlosungen, Treuchtlingen (DE)

( * ) Notice: Subject to any disclaimer, the term of this patent is extended or adjusted under 35 U.S.C. 154(b) by 0 days.

(21) Appl. No.: 10/835,540

(22) Filed: Apr. 28, 2004

(65) Prior Publication Data

US 2005/0000574 A1 Jan. 6, 2005

Related U.S. Application Data

(60) Provisional application No. 60/466,332, filed on Apr. 28, 2003.

(51) Int. Cl.
*F16K 5/00* (2006.01)

(52) U.S. Cl. .................. 251/11; 251/304; 310/306; 60/527

(58) Field of Classification Search .............. 251/11, 251/304; 137/625.3, 625.33; 310/306, 307; 60/527

See application file for complete search history.

(56) References Cited

U.S. PATENT DOCUMENTS

| | | | |
|---|---|---|---|
| 240,059 A | 6/1881 | Wales | |
| 348,841 A | 7/1886 | Hainley | |
| 1,148,986 A | 8/1915 | Prinz | |
| 1,288,060 A | 12/1918 | Le Duc | |
| 1,658,669 A | 2/1928 | Cohn et al. | |
| 2,518,941 A | 8/1950 | Satchwell et al. | |
| 2,975,307 A | 3/1961 | Schroeder et al. | |
| 3,280,550 A | 9/1964 | Cassidy | |
| 3,436,016 A | 4/1969 | Edwards | |
| 3,452,175 A | 6/1969 | Wilkes | |
| 3,452,309 A | 6/1969 | Wilkes | |
| 3,474,964 A * | 10/1969 | Woodling | ............... 236/101 R |
| 3,634,803 A | 1/1972 | Willson et al. | |
| 3,641,296 A | 2/1972 | Schwarz | |
| 3,664,582 A | 5/1972 | Jackson et al. | |
| 3,725,835 A | 4/1973 | Hopkins et al. | |
| 3,748,197 A | 7/1973 | Willson et al. | |
| 3,797,450 A | 3/1974 | Frisbee | |
| 3,940,935 A | 3/1976 | Richardson et al. | |
| 3,946,669 A | 3/1976 | Johne et al. | |

(Continued)

FOREIGN PATENT DOCUMENTS

DE 4209815 9/1993

(Continued)

OTHER PUBLICATIONS

Int'l Search Report and Written Opinion for PCT/US04/13259.

(Continued)

*Primary Examiner*—John Fox
(74) *Attorney, Agent, or Firm*—Dority & Manning, P.A.

(57) ABSTRACT

In one embodiment of the present invention, a shape memory alloy ("SMA")-actuated flow controller comprises a number of grille members, each having a long axis and being slideable relative to one another parallel to that long axis. The SMA-actuated flow controller also includes a frame configured to guide the number of grille members, and an actuator disposed within the frame to move at least one of the number of grille members for varying a size of an aperture. Further, the actuator includes an SMA actuator that includes a number of SMA elements each connecting one grille number to another.

14 Claims, 14 Drawing Sheets

U.S. PATENT DOCUMENTS

| | | |
|---|---|---|
| 4,027,953 A | 6/1977 | Jacob |
| 4,134,542 A | 1/1979 | Sugiura |
| 4,150,544 A | 4/1979 | Pachter |
| 4,233,779 A | 11/1980 | Griffith |
| 4,319,659 A | 3/1982 | Heckelman |
| 4,427,216 A | 1/1984 | Kato et al. |
| 4,472,939 A | 9/1984 | Wang |
| 4,497,241 A | 2/1985 | Ohkata |
| 4,541,326 A | 9/1985 | Fukuda et al. |
| 4,559,512 A | 12/1985 | Yaeger et al. |
| 4,579,006 A | 4/1986 | Hosoda et al. |
| 4,586,335 A | 5/1986 | Hosoda et al. |
| 4,626,085 A | 12/1986 | Suzuki |
| 4,652,781 A | 3/1987 | Andrei-Alexandru et al. |
| 4,699,314 A | 10/1987 | Faurie |
| 4,742,680 A | 5/1988 | Mecca |
| 4,751,821 A | 6/1988 | Birchard |
| 4,761,955 A | 8/1988 | Bloch |
| 4,806,815 A | 2/1989 | Honma |
| 4,811,564 A | 3/1989 | Palmer |
| 4,829,767 A | 5/1989 | Mecca |
| 4,841,730 A | 6/1989 | McDonald |
| 4,884,557 A | 12/1989 | Takehana et al. |
| 4,887,430 A | 12/1989 | Kroll et al. |
| 4,914,908 A | 4/1990 | Sugiyama et al. |
| 4,932,210 A | 6/1990 | Julien et al. |
| 4,958,687 A | 9/1990 | Nakagawa |
| 4,977,886 A | 12/1990 | Takehana et al. |
| 4,979,672 A * | 12/1990 | AbuJudom et al. ....... 236/68 B |
| 5,014,520 A | 5/1991 | Orner et al. |
| 5,054,522 A * | 10/1991 | Kowanz et al. ........ 137/625.33 |
| 5,092,781 A | 3/1992 | Casciotti et al. |
| 5,107,916 A | 4/1992 | van Roermund et al. |
| 5,127,228 A * | 7/1992 | Swenson ..................... 60/527 |
| 5,129,753 A | 7/1992 | Wesley et al. |
| 5,165,897 A | 11/1992 | Johnson |
| 5,166,832 A | 11/1992 | Zychowicz |
| 5,172,551 A | 12/1992 | Nakajima et al. |
| 5,182,910 A | 2/1993 | Benecke |
| 5,235,225 A | 8/1993 | Colgate et al. |
| 5,275,219 A | 1/1994 | Giacomel |
| 5,279,123 A | 1/1994 | Wechslen et al. |
| 5,306,979 A | 4/1994 | Schwarz, Jr. |
| 5,312,152 A | 5/1994 | Woebkenberg, Jr. et al. |
| 5,329,873 A | 7/1994 | Tiballi |
| 5,344,506 A | 9/1994 | DeAngelis |
| 5,353,735 A | 10/1994 | Arai et al. |
| 5,396,769 A * | 3/1995 | Brudnicki ..................... 60/528 |
| 5,417,487 A | 5/1995 | Dahnert |
| 5,499,702 A | 3/1996 | Wang |
| 5,556,370 A | 9/1996 | Maynard |
| 5,563,466 A | 10/1996 | Rennex et al. |
| 5,578,053 A | 11/1996 | Yoon |
| 5,618,066 A | 4/1997 | Fu-Hsiang |
| 5,624,012 A | 4/1997 | Wang |
| 5,629,662 A | 5/1997 | Floyd et al. |
| 5,685,148 A | 11/1997 | Robert |
| 5,694,663 A | 12/1997 | Tserng |
| 5,713,870 A | 2/1998 | Yoon |
| 5,747,993 A | 5/1998 | Jacobsen et al. |
| 5,763,879 A | 6/1998 | Mukherjee et al. |
| 5,770,913 A | 6/1998 | Mizzi |
| 5,771,742 A | 6/1998 | Bokaie et al. |
| 5,779,386 A | 7/1998 | Eichhorn |
| 5,816,306 A | 10/1998 | Giacomel |
| 5,829,253 A | 11/1998 | Long et al. |
| 5,847,475 A | 12/1998 | Rauch et al. |
| 5,865,418 A | 2/1999 | Nakayama et al. |
| 5,901,554 A | 5/1999 | Greschik |
| 5,917,260 A | 6/1999 | Garcia et al. |
| 5,933,002 A | 8/1999 | Jacobsen et al. |
| 5,975,468 A * | 11/1999 | Moignier et al. ........... 244/173 |
| 5,990,777 A | 11/1999 | Whiteman, Jr. |
| 6,008,992 A | 12/1999 | KawaKami |
| 6,019,113 A | 2/2000 | Allston et al. |
| 6,023,121 A * | 2/2000 | Dhuler et al. ................ 310/307 |
| 6,069,420 A | 5/2000 | Mizzi et al. |
| 6,073,469 A | 6/2000 | Julien |
| 6,085,834 A | 7/2000 | Thomas et al. |
| 6,102,917 A | 8/2000 | Maitland et al. |
| 6,102,933 A | 8/2000 | Lee et al. |
| 6,126,115 A | 10/2000 | Carrier et al. |
| 6,133,816 A | 10/2000 | Barnes et al. |
| 6,137,206 A * | 10/2000 | Hill ............................ 310/306 |
| 6,145,369 A | 11/2000 | Corbin et al. |
| 6,164,784 A | 12/2000 | Butera et al. |
| 6,218,762 B1 | 4/2001 | Hill et al. |
| 6,255,934 B1 | 7/2001 | Gadini et al. |
| 6,313,562 B1 * | 11/2001 | Barnes et al. ................ 310/306 |
| 6,326,707 B1 | 12/2001 | Gummin et al. |
| 6,327,855 B1 | 12/2001 | Hill et al. |
| 6,333,583 B1 | 12/2001 | Mahadevan et al. |
| 6,363,183 B1 | 3/2002 | Koh |
| 6,364,496 B1 | 4/2002 | Boddy et al. |
| 6,367,252 B1 * | 4/2002 | Hill et al. ...................... 60/528 |
| 6,371,030 B1 | 4/2002 | Gilman et al. |
| 6,374,608 B1 | 4/2002 | Corris et al. |
| 6,404,098 B1 | 6/2002 | Kayama et al. |
| 6,425,343 B1 | 7/2002 | Akers et al. |
| 6,434,333 B1 | 8/2002 | Tanaka et al. |
| 6,441,746 B1 | 8/2002 | Taborisskiy et al. |
| 6,446,876 B1 | 9/2002 | Stefano et al. |
| 6,450,064 B1 | 9/2002 | Christiansen et al. |
| 6,508,437 B1 | 1/2003 | Davis |
| 6,516,146 B1 | 2/2003 | Kosaka |
| 6,527,310 B1 | 3/2003 | Bellamy |
| 6,530,718 B1 | 3/2003 | Nygren et al. |
| 6,574,958 B1 | 6/2003 | MacGregor |
| 6,741,184 B1 | 5/2004 | Miller et al. |
| 6,851,260 B1 | 2/2005 | Mernøe |
| 2002/0113499 A1 | 8/2002 | Nguyen |
| 2003/0106761 A1 | 6/2003 | Taylor |
| 2004/0035108 A1 | 2/2004 | Von Behrens et al. |
| 2004/0035687 A1 | 2/2004 | Szilagyi |
| 2004/0112049 A1 | 6/2004 | Von Behrens et al. |

FOREIGN PATENT DOCUMENTS

| | | |
|---|---|---|
| DE | 19509177 | 9/1996 |
| EP | 0147491 | 7/1985 |
| FR | 7709117 | 10/1978 |
| FR | 2730766 | 8/1996 |
| GB | 2068545 | 8/1981 |
| GB | 2093589 | 9/1982 |
| GB | 2334046 | 8/1999 |
| JP | 62175628 | 8/1987 |
| JP | 62271970 | 11/1987 |
| JP | 7198502 A | 8/1995 |
| JP | 07274561 | 10/1995 |
| JP | 9127398 A | 5/1997 |
| KR | 9605617 | 4/1996 |
| KR | 9607599 | 6/1996 |
| WO | WO 97/19300 | 5/1997 |
| WO | WO 9808355 | 2/1998 |
| WO | WO 0112985 | 2/2001 |
| WO | WO 01/77555 A1 | 10/2001 |

OTHER PUBLICATIONS

Aircraft Maneuverability, http://www.cs.ualberta.ca/~database/MEMS/sma_mems/flap.html, printed Apr. 17, 2003, pp. 1-2.

Bokaie, Latch-Release Pin Puller with Shape Memory Alloy Actuator, Lewis Research Center, http://www.nasatech.com/Briefs/Feb98/LEW16511.html.

Bone Plates, http://www.cs.ualberta.ca/~database/MEMS/sma_mems/bone.html, printed Apr. 17, 2003 pp. 1-2.

Glossary: Pseudo-elasticity (or super-elasticity), http;//www.cs.ualberta.ca/~database/MEMS/sma_mems/glossary.cgi, printed Apr. 17, 2003.

Glossary: Shape Memory Effect, http://www.cs.ualberta.ca/~database/MEMS/sma_mems/glossary.cgi, printed Apr. 17, 2003.

Grant, et al., "Variable Structure Control of Shape Memory Alloy Actuators", IEEE Control Systems 17(3):80-88.

Hashimoto, et al., "Application of Shape Memory Alloy to Robotic Actuators", J. Robotic Systems 2(1): 3-25.

Hirose, et al., "A new design of servo-actuators based on the shape memory effect", Theory and Practice of Robots and Manipulators, 339-349.

Hodgson, et al., Shape Memory Alloys, http://www.sma-inc.com/SMApaper.html, printed Apr. 17, 2003, pp. 1-12.

Ikuta, et al., "Mathematical mode and experimental verification . . . ". IEEE Robotics and Automation 4:103-108.

Ikuta, et al., "Shape Memory Alloy Servo Actuator System with Electric Resistance Feedback and Application for Active Endoscope", Proc. IEEE Int. Conf. on Robotics and Information 427-430.

Ikuta, "Micro/Miniature Shape Memory Alloy Actuator", IEEE Robotics and Automation 3:2156-2161.

Kuribayashi "A New Actuator of a Joint Mechanism Using TiNi Alloy Wire", Int. J. Robotics 4(4):47-58.

Mills Jw, "Lukasiewicz" Insect: The Role of Continuous-Valued Logic in a Mobile Robot's Sensors, Control and Locomotion, in Siquito: Advanced Experiments with a Simple and Inexpensive Robot Chapter 12, pp. 197-211, IEEE Computer Society Press, Los Alamitos, CA USA ISBN 0-8186-7408-3.

Otsuka, et al., "Shape Memory Materials", pp. 36-48, Cambridge University Press, Cambridge, England ISBN 0-521-44487X.

Rediniotis, et al., Development of a Shape-Memory Alloy Actuated Biometric Hydrofoil, Journal of Intelligent Material Systems and Structures, 13:35-49.

Robotic Muscles, http://www.cs.ualberta.ca/~database/MEMS/sma_mems/muscle.html., printed Apr. 17, 2003, pp. 1-4.

Shape Memory Alloys, http://www.cs.ualberta.ca/~database/MEMS/sma_mems/sma.html., printed Apr. 17, 2003, pp. 1-4.

Smith, et al., Development of Shape Memory Alloy (SMA) Actuated Mechanisms for Spacecraft Release Applications, SSC99-XI-7, 13th AIAA/USU Conference on Small Satellites.

Technical Characteristics of Flexinol™ Actuator Wires, Dynalloy, Inc., Printed on Feb. 16, 2001.

WPI Database XP002202662, "Shape memory metal actuator control device - has minimum and maximum detector to monitor state of actuator based on its minimum and maximum allowable impedance".

Supplementary Partial International Search Report for EP 0475 0929, Apr. 19, 2004.

Abstract of JP60064142, Ventilating Device, Apr. 12, 1985, Yoshinori.

* cited by examiner

FLOW CONTROL ASSEMBLIES HAVING INTEGRALLY FORMED SHAPE MEMORY ALLOY ACTUATORS

CROSS REFERENCE TO RELATED APPLICATIONS

This application claims benefit under 35 U.S.C. 119(e) of U.S. Provisional Patent Application No. 60/466,332 filed Apr. 28, 2003 entitled "Flow Control Assemblies Having Integrally Formed Shape Memory Alloy Actuators," which is incorporated herein by reference in its entirety.

FIELD OF THE INVENTION

The present invention relates generally to the field of controlling gas flow, as well as levels of illumination, and more particularly, to shape memory alloy-actuated mechanisms for controlling, for example, the flow volume of air, light, and the like.

BACKGROUND OF THE INVENTION

Air valves controlling the flow of air in ventilation systems are commonly found in a variety of applications, such as in vehicles, industrial equipment, exhaust ducts, etc. Conventional air valves generally rely on driving flaps or louvers to open and close apertures for controlling flow. Often the flow control mechanisms for actuating the flaps or louvers are located outside of the duct in which the flap is controlling air flow, and typically occupies a relatively significant amount of space. Moreover, common air valves rely on electrical stepper motors or other bulky drive mechanisms for actuating one or more flaps that increase the form-factor and weight of the air valve system. As an example, consider a common air valve of an automotive ventilation system 100 of FIG. 1. As shown, a flap 104 is configured to control the flow of air, for example, through duct 102 to provide heat and air conditioning inside a passenger compartment. Actuator 106 is connected to flap 104 to control the flow of air in duct 102. As is shown, actuator 106 extends out from the interior duct to a remote drive mechanism 108, which generates a motive force for translating actuator 106 to control the position of flap 104. With drive mechanism 108 and actuator 106 located substantially outside of duct 102, a significant amount of space is consumed in providing for control of flap 104. So, the use of traditional air valves in systems like automotive ventilation system 100, as well as other traditional vent control systems, typically increases the size and the cost of the overall system because of additional space requirements to accommodate such bulky valve control systems.

In view of the foregoing, what is needed is an apparatus and method for the control blocking and partial blocking of an aperture, such as a ventilation duct, to overcome the above-described shortcomings existing in the prior art.

SUMMARY OF THE INVENTION

In one embodiment of the present invention, a shape memory alloy-actuated flow controller comprises a number of grille members, each having a long axis and being slideable relative to one another along that axis. The flow controller also includes a frame to guide the number of grille members as they move, and an actuator within the frame for moving at least one of the grille members to vary a size of an aperture. In a specific embodiment, the actuator is a shape memory alloy ("SMA") actuator that includes a number of SMA elements each connecting one grille member to another.

In another embodiment of the present invention, a shape memory alloy-actuated flow controller comprises a rotatable flap having a shaft along an axis about which the rotatable flap rotates. Also, the flow controller includes an actuator within the shaft and for generating a force that causes the rotatable flap to rotate. In at least one embodiment, the actuator is a shape memory alloy ("SMA") actuator that includes a number of SMA elements. In some embodiments, the shaft has an end including an interface for receiving an engagement member, which in some cases, is coupled to a spring. In at least one embodiment, the interface is helically-shaped and configured to convert an axial force generated by the engagement member as it translates along the axis into a rotational force applied to the shaft, where the axial force is created by the contraction of at least one SMA element. Some examples of desirable attributes of these embodiments without limitation are: (1) a desirable force profile for SMA elements when used over certain angles, (2) low or no off-axis load imposed on bearings or pivoting members of the flap, thereby allowing these components to remain relatively simple and inexpensive compared to what is commonly used in the industry, (3) the flow controller is relatively small in size because the SMA element (e.g., wire) is integrally formed in the flap shaft, (4) the flow controller is relatively easy to integrate into current duct configurations, and (5) there are no moving contacts and few moving parts, thereby increasing reliability of the flow controller, etc.

BRIEF DESCRIPTION OF THE DRAWINGS

The invention is more fully appreciated in connection with the following detailed description taken in conjunction with the accompanying drawings, in which.

Like reference numerals refer to corresponding parts throughout the several views of the drawings.

DETAILED DESCRIPTION OF EXEMPLARY EMBODIMENTS

The present invention provides numerous apparatuses and methods for integrating shape memory alloy ("SMA") actuators to control light or air flow, by moving shutters, louvers, flaps, valves and other like flow control mechanisms. In some embodiments, SMA actuators are formed, in part or in whole, into a frame, an axle or other typical component of a flow control system. Among other things, an integrated SMA-actuated flow controller of the present invention enables ventilation systems and other controllable flow systems to consume less space than otherwise would be used for controlling the flow of light or air.

Figure 1:
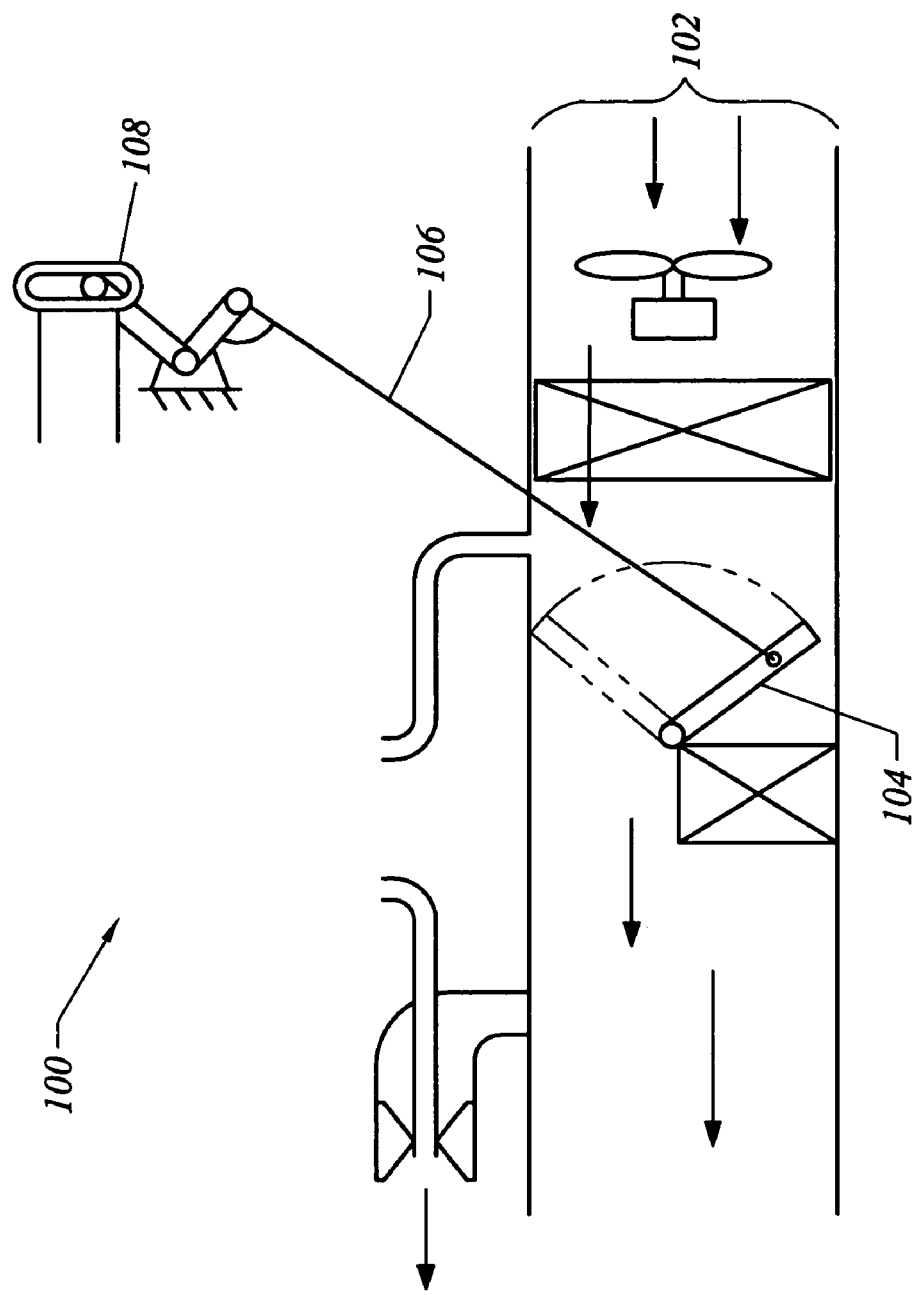
FIG. 1 depicts a prior art flow controller.
Figure 2A:
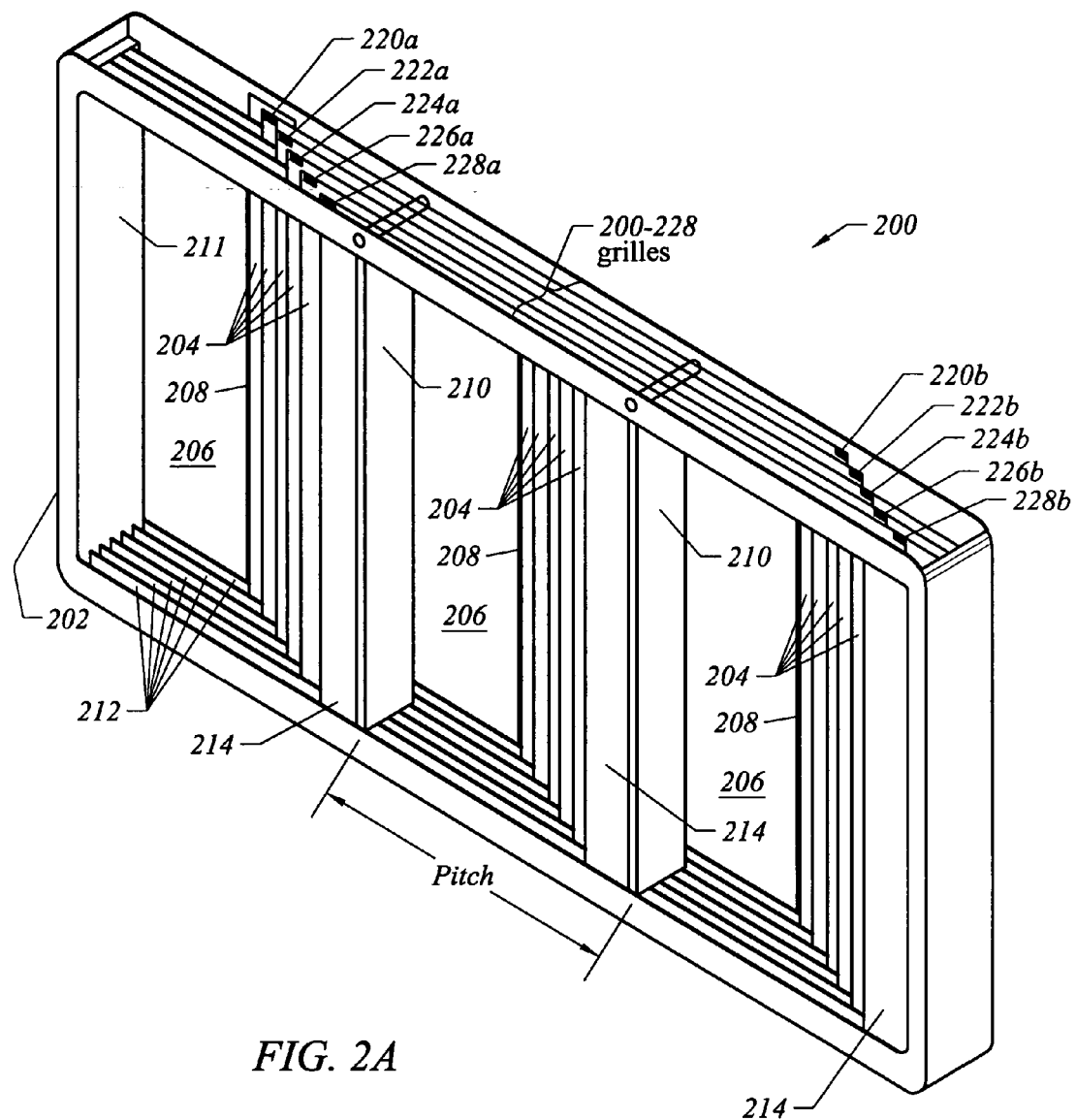
FIG. 2A is a perspective view of a shape memory alloy ("SMA")-actuated flow controller, according to one embodiment of the present invention.

FIG. 2A is a perspective view of a shape memory alloy ("SMA")-actuated flow controller 200, according to one embodiment of the present invention. Exemplary flow controller 200 includes a frame 202 configured to include one or more SMA-actuators compactly integrated within its structure, where each of the SMA-actuators generate a motive force to control at least one aperture 206 through which passes air, light, fluid or the like. As frame 202 is designed for placement in an air or light flow, such as a duct of a ventilation system, an entire actuation mechanism (i.e., SMA actuator) of the present invention can be disposed wholly within a duct or passage.

SMA-actuated flow controller 200 includes at least one SMA actuator that can be configured to drive any number of grilles 220–228 arranged within frame 202 to adjust the size of apertures 206. Each of grilles 220–228 is uniquely identifiable by a pair of attachment points (i.e., attachment points 220a and 220b identify grille 220, attachment points 222a and 222b identify grille 222, and so on). Further, any one of grilles 220–228 includes a number of flow restricting members 204 as "flow restrictors" that each can incrementally meter flow through apertures 206. An example of such a grille and its flow restrictors is described next.

Figure 2B:
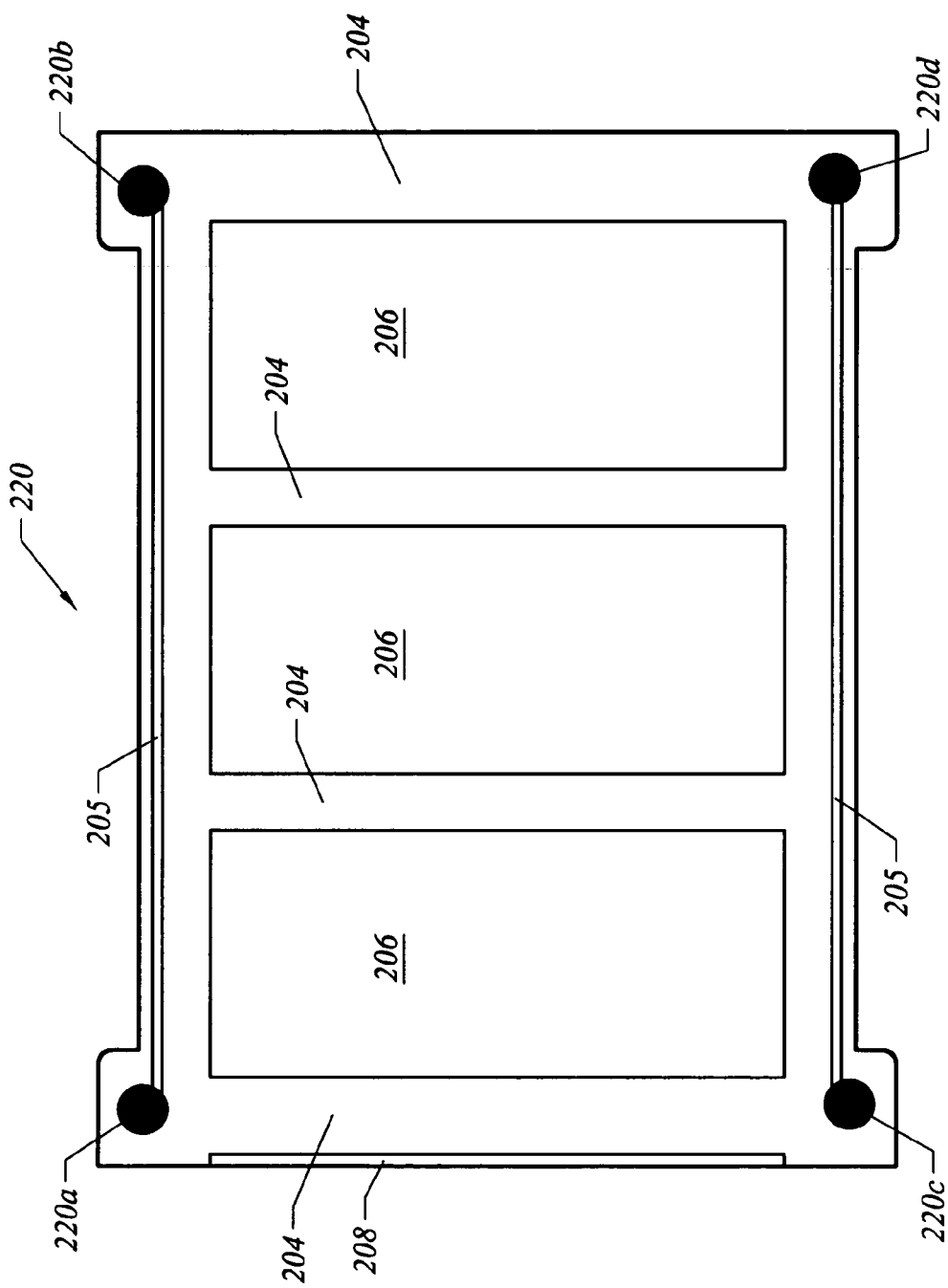
FIG. 2B illustrates an exemplary grille and its flow restricting members of a specific embodiment of the present invention.

FIG. 2B illustrates an exemplary grille and its flow restricting members. An exemplary grille 220 suitable for controlling flow includes four flow restricting members 204 or "slats," in this case, each having a surface area designed to contribute a restrictive barrier that can cooperate with additional slats 204 of other grilles to effectuate flow control of a particular aperture 206. For example, the width of each slat 204 can be configured to cover a portion of a pitch, which is shown in FIG. 2A as the spacing between duct frame members 210. To determine a width of slat 204, the pitch is divided by the number of grilles 200–228 implemented within frame 202. For example, if five grilles 200–228 are used and if the pitch is five centimeters (5 cm), then the width of slat 204 on each grille will be about one centimeter (1 cm). In some embodiments, the width of slat 204 can vary to provide some additional overlap between slats 204 of adjacent grilles. This overlap bolsters flow restriction to close or nearly close gaps, if any, from grille to grille.

Grille 220 includes any number of attachment points, each of which are adapted to receive and to connect an end of an SMA element extending from another grille (e.g., grille 222, 224, etc.). In the example shown in FIG. 2B, grille 220 includes four attachment points 220a, 220b, 220c and 220d. Since a current passes through each SMA element to generate a motive force, these attachment points 220a, 220b, 220c and 220d are electrically conductive. Further, a conductive path 205 extends from one attachment point to a next on grille 220. For example, a first and a second conductive path extend from attachment point 220a to attachment point 220b and from attachment point 220c to attachment point 220d, respectively. As will be discussed below, conductive paths 205 are designed to electrically couple SMA elements in a serial fashion. In at least one other embodiment, grille 220 is formed, in part or in whole, of conductive material such that conductive paths 205 are not required; each grille provides a conductive path for actuating (e.g., contracting) SMA elements of the present invention.

Referring back to FIG. 2A, at least one slat 204 of a leading grille is optionally configured to include a sealing surface 208. Grille 220 is a leading grille if its slats 204 contact frame members 210 of frame 202. So when SMA-actuated flow controller 200 is in a fully closed state (i.e., apertures 206 are no longer present), the leading edge of slats 204 on grille 220 can include sealing surface 208, which could be a relatively soft rubberized strip or like sealing material. In this manner, when the SMA-actuated grilles are extending into the fully closed position, a seal is formed between a leading edge of grille 220 and frame edge 211 and frame members 210. Note FIG. 2A shows each slat of grille 220 including sealing surface 208, whereas FIG. 2B illustrates only one sealing surface 208. Each slat 204 of grille 220 can include a sealing surface 208 according to a specific embodiment.

Grille 220 and other grilles 222, 224, 226 and 228 are each disposed in guide channels 212 in a staggered arrangement for modifying flow volumes, as shown. Upon actuation of at least one SMA element, one or more of these grilles slide relative to each other into a relative staggered position when traversing across the duct openings (i.e., apertures 206). As the SMA-actuated grilles are moved toward a further staggered formation, blockage of each aperture 206 increases. In one embodiment, guide channels 212 are spaced so as to provide a set of low-profile, stacked sliding grilles. When SMA-actuated flow controller 200 is in a fully open state, slats 204 are aligned in an eclipsed slat position, which is in alignment with slat curtains 214. That is, each slat 204 is positioned behind a corresponding slat curtain 214. But when the sliding grilles have their slats 204 brought toward a relatively staggered position, SMA-actuated flow controller 200 approaches its fully closed condition. So, by avoiding the implementation of rotating slats (or louvers), and by building shape memory alloy (SMA) actuators into a sliding grille framework system, SMA-actuated flow controller 200 can be formed in a relatively compact form factor, according to at least one embodiment of the present invention.

Figure 2C:
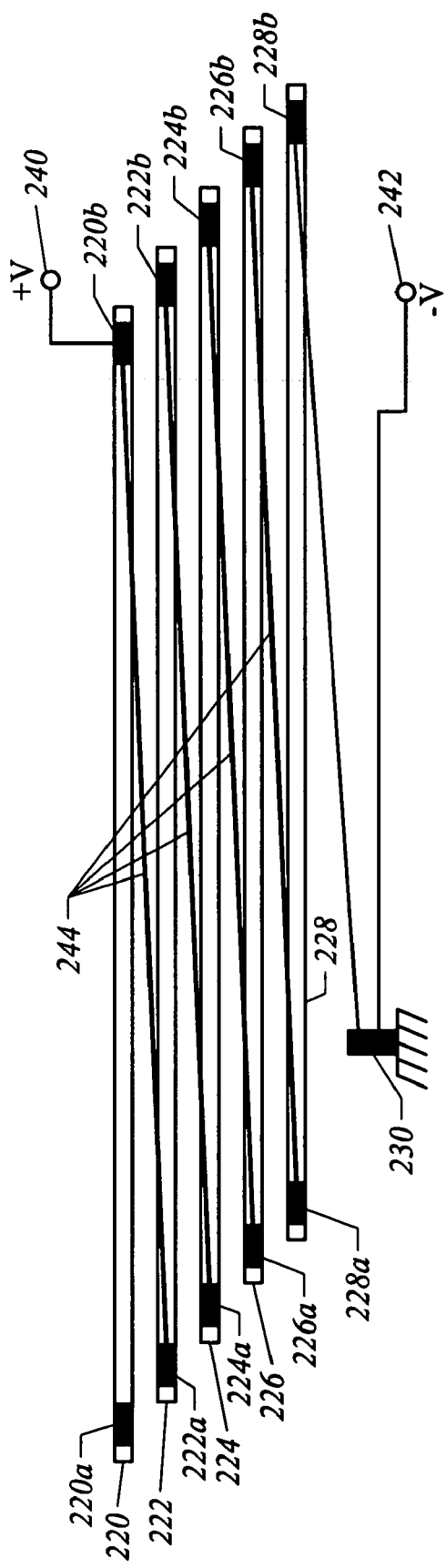
FIG. 2C is a top view of an exemplary SMA-actuator configuration in accordance with one embodiment of the present invention.
Figure 2D:
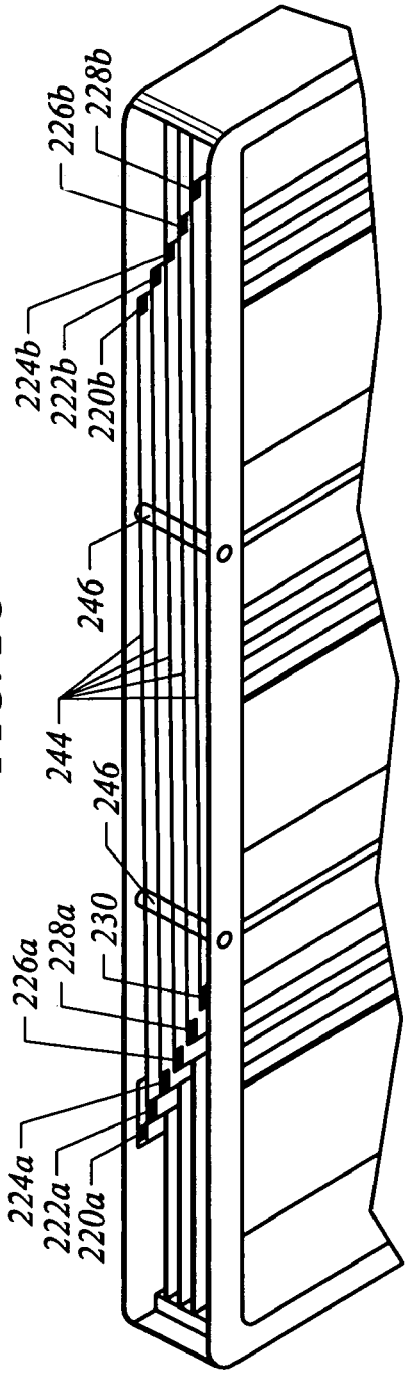
FIG. 2D is a perspective view of an exemplary SMA-actuator configuration in accordance with one embodiment of the present invention.

FIGS. 2C and 2D depict an exemplary SMA-actuator configuration in accordance with one embodiment of the present invention. FIG. 2C is a top view and FIG. 2D is a perspective view of a portion of SMA-actuated flow controller 200 of FIG. 2A. As is shown in FIG. 2C, grille 220 is coupled mechanically and electrically to grille 222 by one of SMA elements 244 having a first end connected at attachment point 220b and a second end connected at attachment point 222a. Grilles 224, 226 and 228 are coupled in a similar fashion, with an associated SMA element 244 coupling the adjacent grilles. FIG. 2D depicts SMA element supports 246 over which SMA elements 244 traverse. That is, supports 246 prevent SMA elements 244 from contacting the grilles. An ordinarily skilled artisan should appreciate that supports 246 can be structures that have thermal and electrical properties suitable for implementation in SMA-actuated flow controller 200. Note that although not shown in FIG. 2C, attachment points of the same grille, such as 222a and 222b, are coupled by a conductive path 205.

An SMA "element" refers to an SMA material of elongate form, capable of contraction and elongation along the longitudinal axis. The element may have a circular cross-section, as is the case for a wire, or any of a variety of cross-sections such as elliptical, square, rectangular, or the like. Shape memory alloy ("SMA") refers to metals, which exhibit two very unique properties, pseudo-elasticity, and the shape memory effect. Pseudo-elasticity refers to the almost rubber-like flexibility of SMAs. The shape memory effect refers to the unique ability of shape memory alloys to be severely deformed and then returned to their original shape simply by heating them. By way of example and not limitation, shape memory alloys include NiTi (Nickel-Titanium), CuZnAl, and CuAlNi among others.

Further to FIGS. 2C and 2D, and according to a specific embodiment, a single SMA actuator can be formed by configuring attachment points 220b and 230 as terminals 240 and 242, respectively. In particular, a positive voltage ("+V") can be applied via terminal 240 to attachment point 220b, and either a ground or a negative voltage ("−V") can be applied via terminal 242 to attachment point 230, which is affixed onto frame 202. In this configuration, all of the associated SMA elements 244 are powered in unison to control the position of all the grilles (e.g., by a series connection to a power source). Note that a pulse-width modulated ("PWM") signal having a programmable width, or any other like power signal can be applied between terminals 240 and 242 to practice the present invention. In some embodiments, a suitable SMA-actuator configuration for implementing an SMA-actuated flow controller is similarly described (in terms of interconnected plates rather than grilles) in one or more of the following: U.S. Pat. No. 6,574,958 and U.S. patent application Ser. No. 10/080,640, both of which are incorporated by reference in their entirety.

Figure 2E:
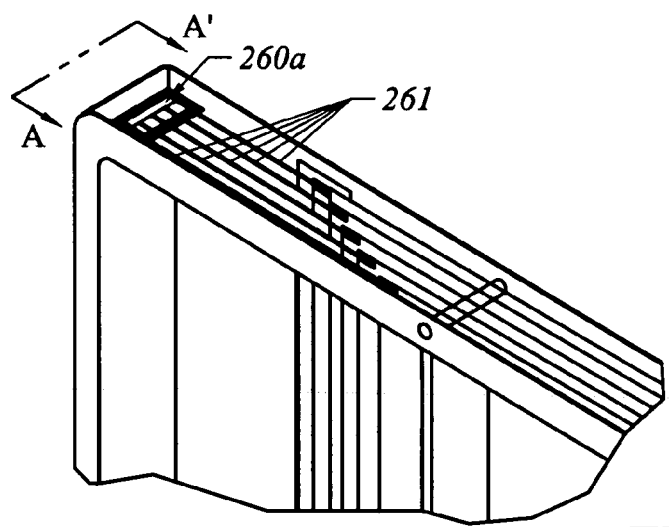
FIG. 2E illustrates an example of the placement of two or more electrodes on a frame for providing power and ground to the SMA elements in accordance with a specific embodiment of the present invention.
Figure 3A:
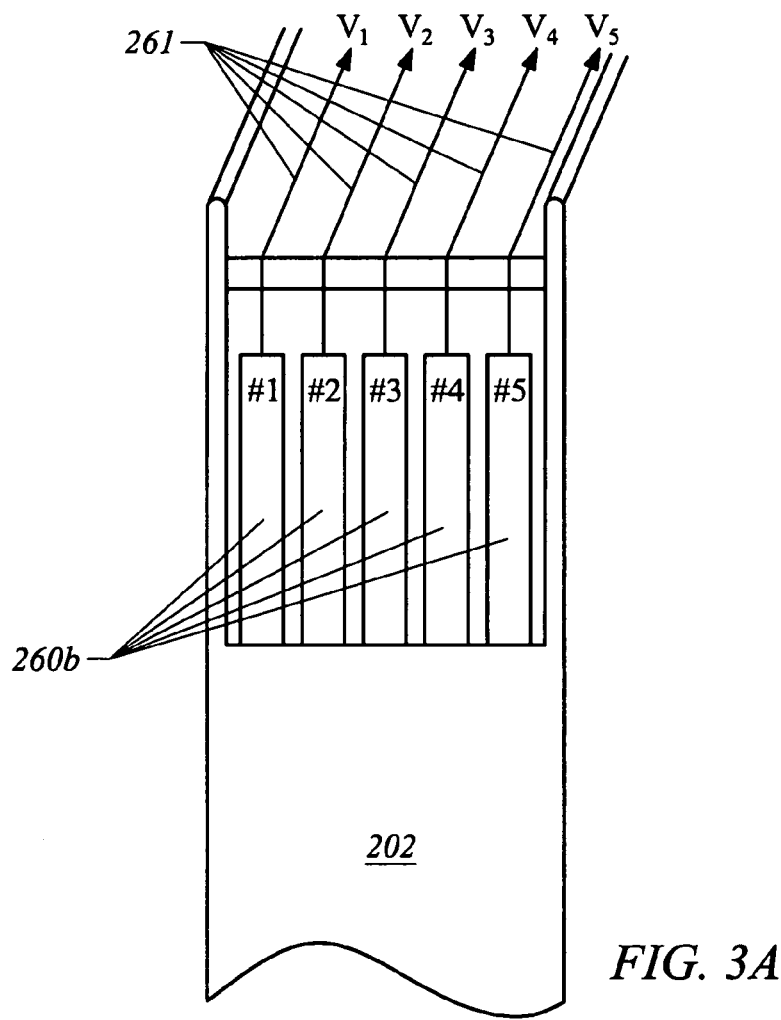
FIG. 3A shows a number of electrodes for selectably contracting one or more individual SMA elements in accordance with a specific embodiment of the present invention.

FIG. 2E and FIG. 3A illustrate another specific embodiment, where a single SMA actuator is formed between each attachment point pair over adjacent grilles. In this configuration, the SMA elements are mechanically connected in series, but each SMA wire is individually selectable by applying power between any pair of attachment points. So, each SMA element can be selected and actuated by applying appropriate power signals to specific pairs of attachment points via conductors 261, each of which extend from electrodes located at 260a. For example, an actuator controller (not shown) can supply power and ground signals via conductors 261 to attachment points 226a and 224b of FIG. 2C to actuate the SMA element connecting those attachment points. As is shown in FIG. 3A, each electrode of 260b can be integrated into frame 202 and can be configured to receive a power signal from the actuator controller. As is shown in FIG. 3, electrode #1 is configured to deliver a first voltage, V1, to attachment point 220a, electrode #2 is configured to deliver a second voltage, V2, to attachment point 222a, and so on, thereby providing each grille with a separate actuator mechanism to move that grille. A desired level of aperture blockage determines a corresponding number of grilles that are moved into fully closed or blocked positions. As such, aperture blockage can be implemented at discrete levels. To discretely adjust apertures 206, each successive SMA element 244 can be powered until a sufficient number of grilles have been brought to a desired staggered position. This approach obviates the need for closed-loop position feedback for use by an actuator control system (not shown), thus enabling a more economical solution. In a specific embodiment, an end-of-travel limit switch or other like indicator mechanism can be employed to control operation (e.g., motion) of an SMA-actuator of the present invention.

As an example of discrete flow control, consider that each of the five SMA elements 244 of FIG. 2C contribute 20% blockage of the apertures 206. First, consider that SMA-actuated flow controller 200 is initially in a fully open state (i.e., each grille is behind curtain 214). To change the aperture openings from 100% to 80% open, an actuator controller applies a power signal to electrode #5, which applies power between attachment points 228a and 230, thereby causing an intermediate SMA element to contract. Further to this example, an actuator controller can change the aperture openings from 80% open to 40% open by applying a power signal to electrode #3, which is connected to attachment point 224a. This causes the next two SMA elements in series to contract.

Figure 3B:
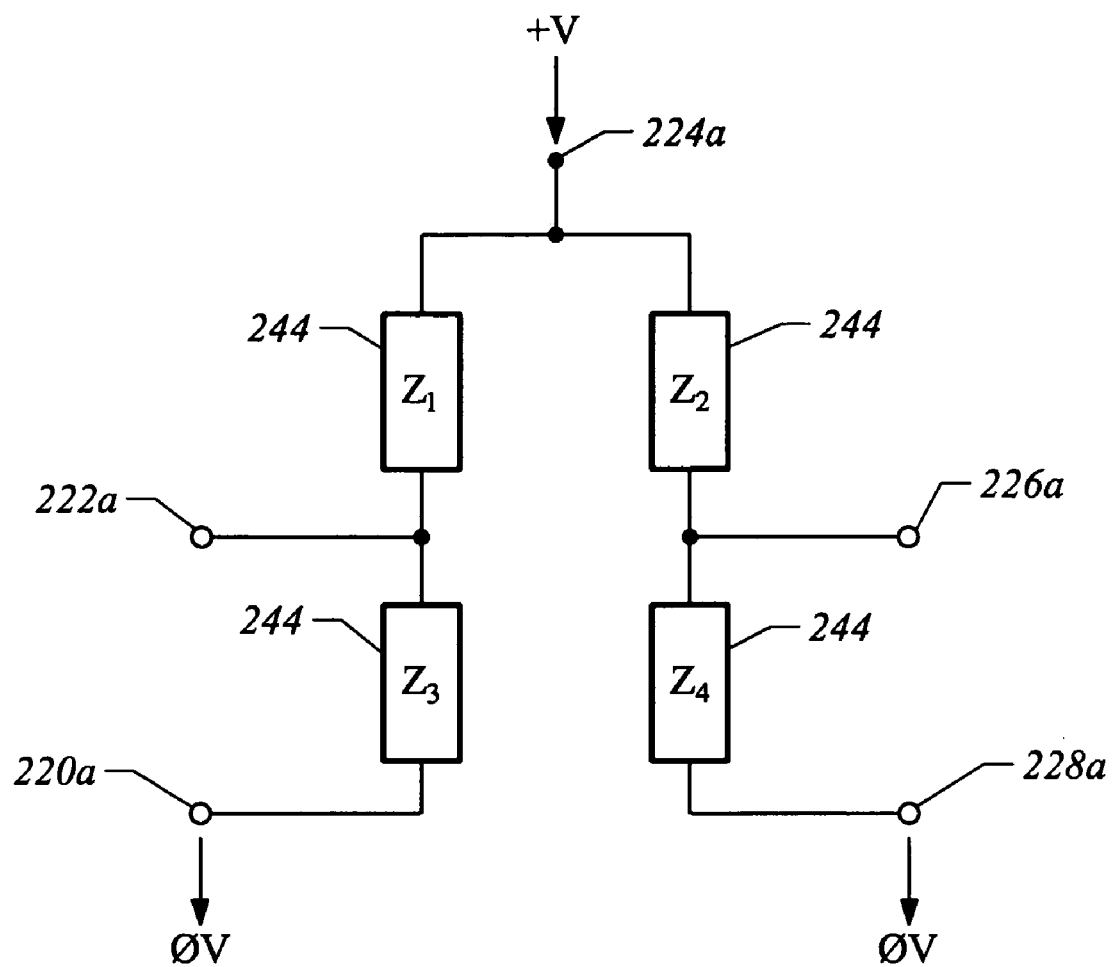
FIG. 3B illustrates an example of an application of one or more power signals and/or one or more ground returns for one of many combinations of select electrodes, according to a specific embodiment of the present invention.

FIG. 3B illustrates an example of the application of one or more power signals (e.g., positive voltages, DC or pulse-width modulated) and/or one or more ground returns (e.g., negative voltages or zero potential) to any one of many combinations of selected electrodes 260b, according to a specific embodiment of the present invention. For example, consider that a power signal is applied to electrode #3 (i.e., attachment point 224a) and two ground signals—one at electrode #1 (i.e., attachment point 220a) and another at electrode #5 (i.e., attachment point 228a). In this configuration, the impedances of Z1 and Z3 are in parallel with impedances Z2 and Z4. With these impedances combined in parallel, a lower impedance results. This allows apertures 206 to close more quickly than if a power signal is coupled between attachment points 220a and 228a.

Figure 4:
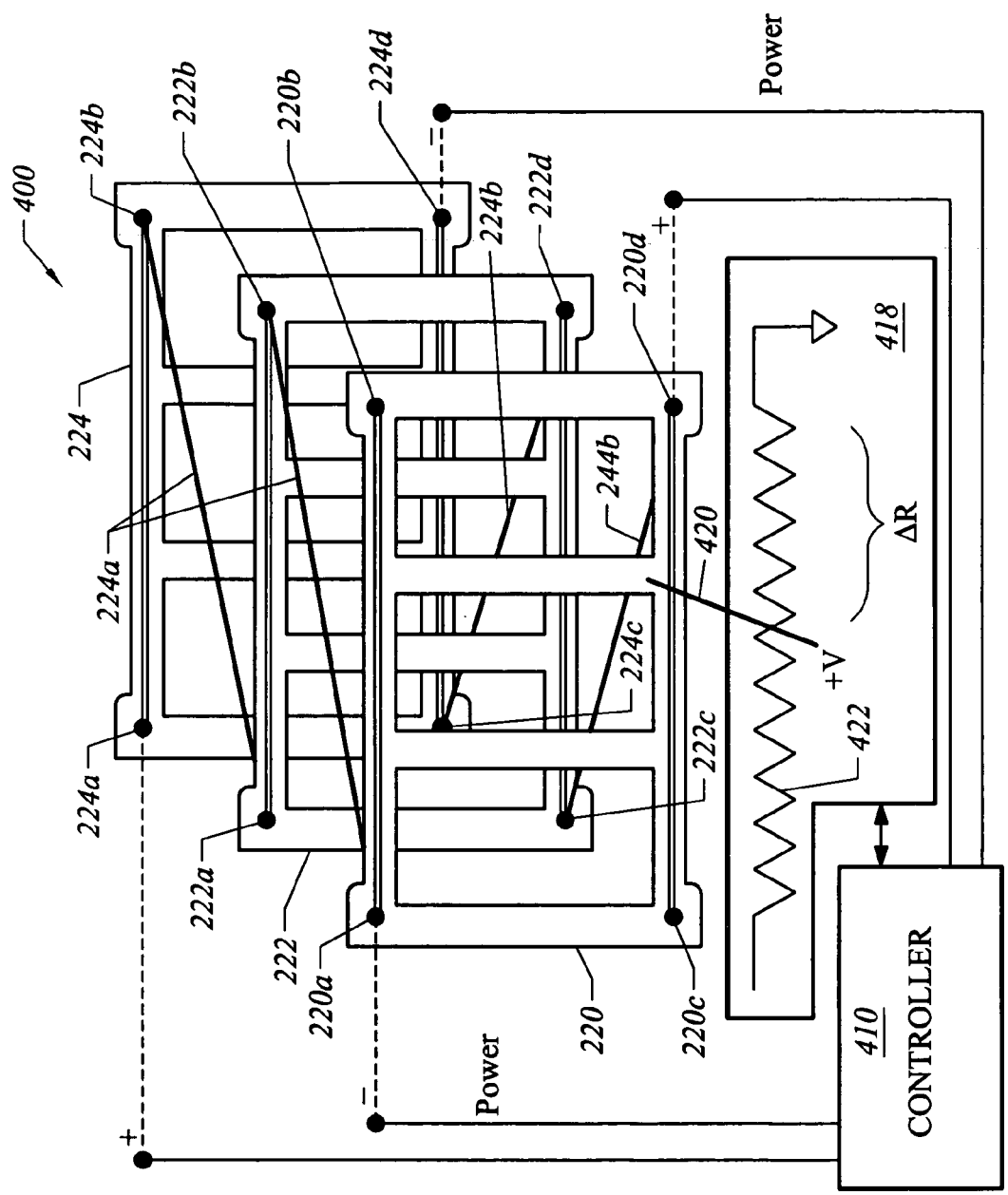
FIG. 4 illustrates a feedback control system according to one embodiment of the present invention.

FIG. 4 illustrates a feedback control system according to one embodiment of the present invention. In this example, aperture controller 410 is coupled to attachment points 224a and 220a to respectively provide a power signal and a ground return for SMA-actuated flow controller 400. In this case, the level of aperture blockage is measured by a potentiometer sensor 418. Such a sensor includes a fixed resistive strip 422 located on frame 200, a wiping contact 420 mounted onto leading grille 220a in wiping contact with resistive strip 422. Sensor 418 is coupled to aperture controller 410, which can be a computing device (e.g., a microcontroller or the like) operating in accordance with the executed instructions. Aperture controller 410 determines a resistance difference ("ΔR") based on a voltage, +V, wherein the resistance difference correlates to the location of the grille, and thereby to a specific aperture opening size. As such, the degree of blockage can be determined. An ordinarily skilled artisan should appreciate that other types of feedback control system are suitable for controlling aperture size adjustments according to the present invention. A closed-loop position feedback mechanism, such as that described above, is not required for the previously-described discrete control of actuation. Also, this feedback mechanism may be used when antagonistic actuation is introduced into SMA-actuated flow controller 400. Moreover, any known type of position sensor operable to measure the position of one or more grilles, when determining the level of aperture blockage, is within the scope and spirit of the present invention.

In accordance with a specific embodiment of the present invention, another SMA actuator is formed from attachment point 220d via SMA elements 244b to attachment point 224c, which is connected to attachment point 224d. As such, aperture controller 410 is also coupled between attachment points 224c and 220d in a similar fashion as previously described. This SMA actuator operates in an opposite, antagonistic fashion. So, if attachment points 224a and 220a and intermediate SMA elements 244a are configured to open or unblock apertures 206, then attachment points 220d and 224d and intermediate SMA elements 244b are configured to close or block those same apertures. A benefit of using two SMA actuators in an antagonistic fashion is that the temperature compensating features of the SMA are balanced by having an SMA actuator on each side of the grill. Note that although FIG. 4 shows three grilles, any number of grilles can be included in SMA-actuated flow controller 400.

Figure 5:
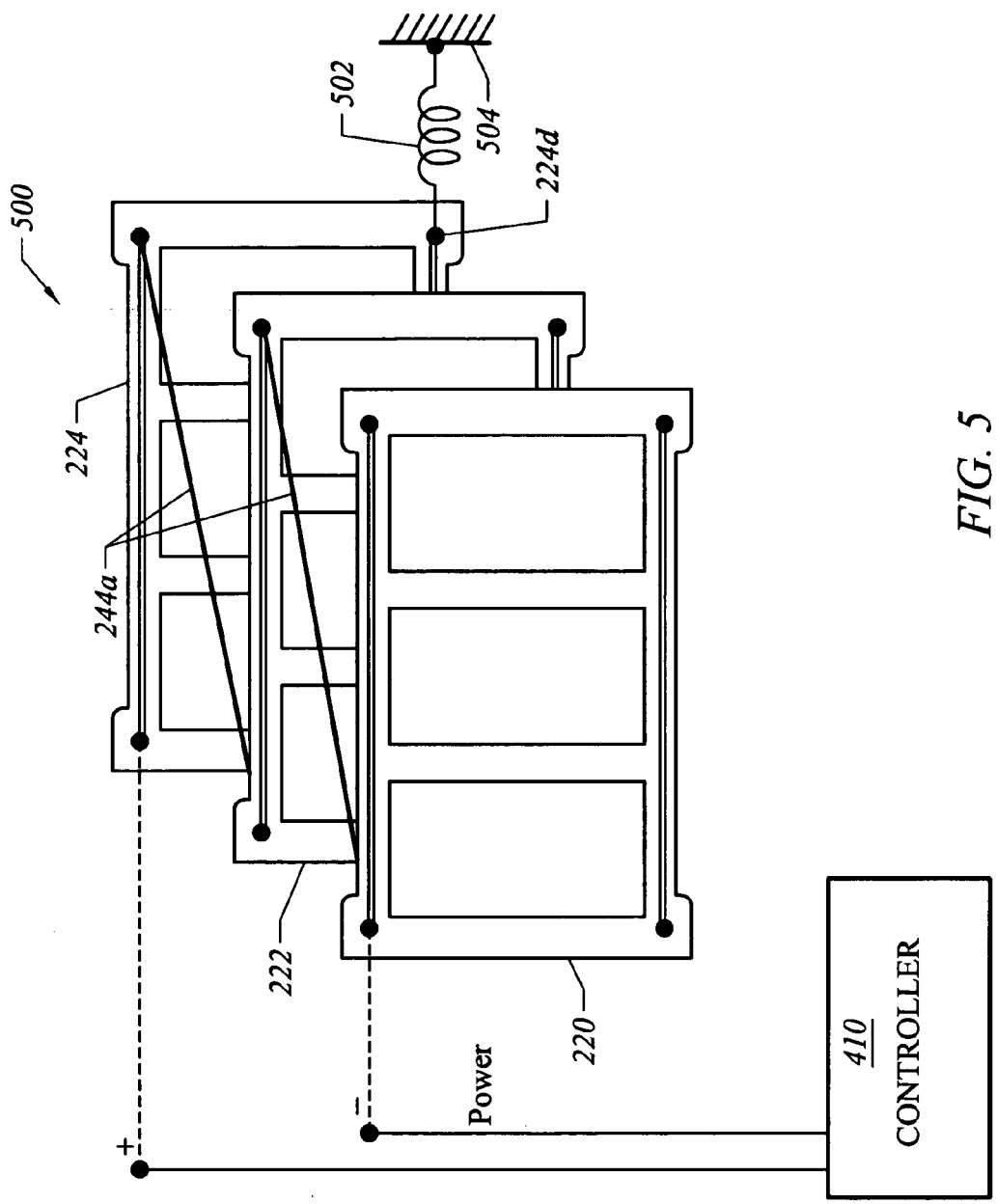
FIG. 5 illustrates an SMA-actuated flow controller according to another embodiment of the present invention.

FIG. 5 illustrates an SMA-actuated flow controller according to another embodiment of the present invention. Although similar in some aspects to SMA-actuated flow controller 400 of FIG. 4, SMA-actuated flow controller 500 includes a single SMA actuator with an appropriately selected opposing or restoring force such as, for example, a spring 502 anchored to a fixed support 504, such as frame 202 of FIG. 2. So, in the case of a single SMA actuator with a spring, the mechanical output of the SMA may vary over a given temperature range while a spring force will remain largely unchanged over the same temperature range. This temperature-based resistance variation can be compensated for as suggested above by the use of antagonistic SMA actuators. An artisan having ordinary skill should appreciate that other types restoring forces other than a spring are suitable for controlling aperture size adjustments according to the present invention.

As described above, FIGS. 2–5 illustrate various embodiments wherein SMA-actuated flow controllers operate primarily with grilles that slide with respect to each other to effectuate flow control. Next, FIGS. 6–9C depict other SMA-actuated flow controllers in accordance with other embodiments of the present invention. In these other embodiments, one or more SMA actuators are disposed within or nearly within the duct or passage through which air, light, fluids, etc. flow. Unlike the previously disclosed embodiments, one or more SMA actuators generate rotational motion about an axis of rotation, where the SMA actuators can be disposed either within or without a rotatable member, or both.

Figure 6:
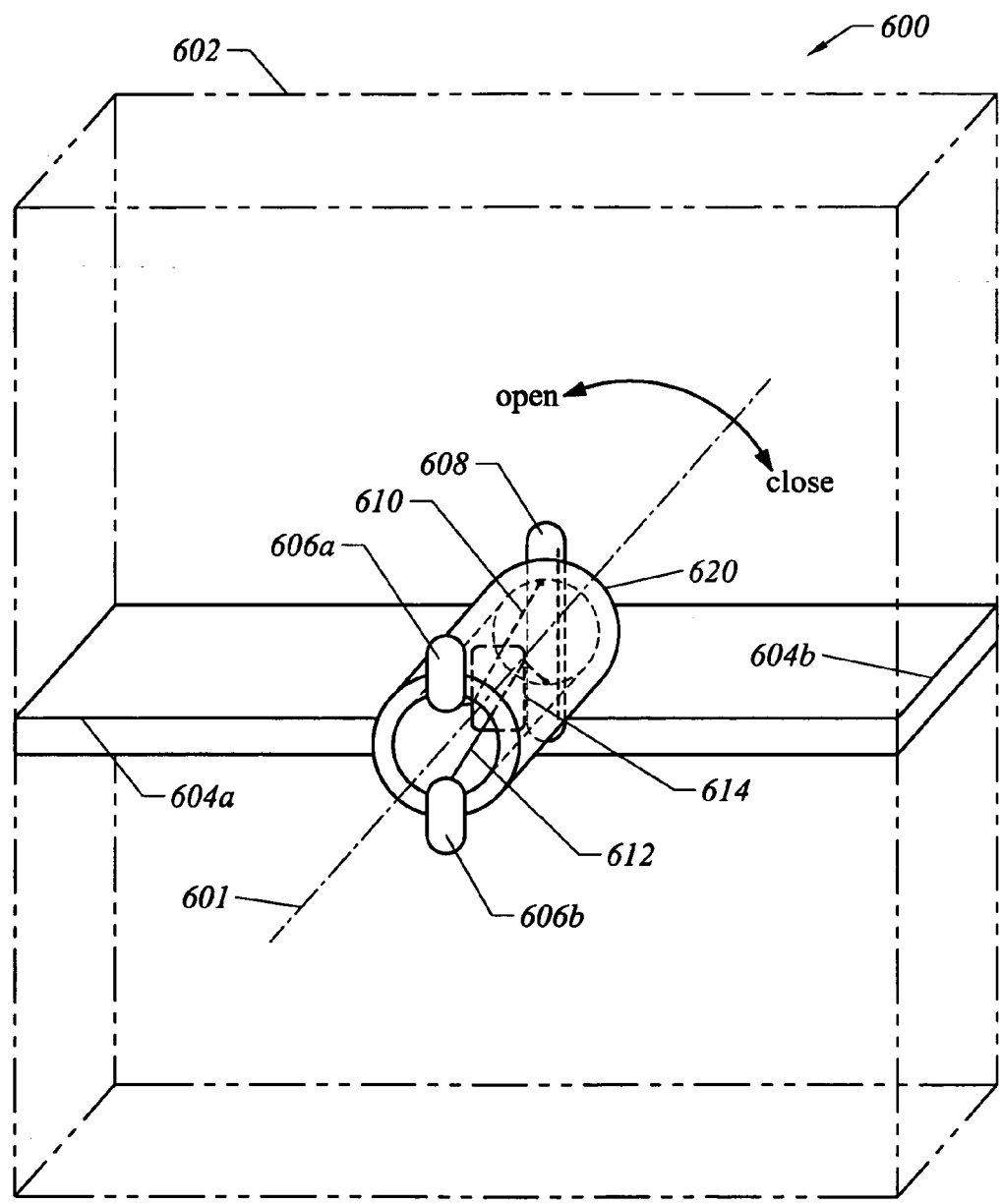
FIG. 6 depicts an exemplary SMA-actuated flow controller according to one embodiment of the present invention.

FIG. 6 depicts an exemplary SMA-actuated flow controller 600 according to one embodiment of the present invention. In this instance, SMA-actuated flow controller 600 includes one or more SMA elements disposed within a shaft 620 (i.e., an axle) in a flap composed of flap member 604a and flap member 604b. As is shown in FIG. 6, shaft 620 is mechanically coupled to each of flap members 604a and 604b, all of which form a rotatable flap. In some embodiments, shaft 620 can be supported by duct housing 602 so the rotatable flap is relatively free to turn within duct housing 602. Duct housing 602 can be a dedicated housing adaptable to be disposed within a duct, or alternatively, duct housing 602 can represent a portion of a duct, such as in a vehicle ventilation system, in which SMA-actuated flow controller 600 is integrated. In operation, the rotatable flap rotates about axis 601 by a degree determined by an amount of rotational force developed by one or more SMA elements located, in this instance, within shaft 620. As is shown in FIG. 6, the rotatable flap is in a fully open state. But when the one or more SMA elements 610, 612 are actuated, then the rotatable flap can close fully such that the flap is orthogonal to a flow passing through the duct, thereby minimizing or ceasing flow.

SMA-actuated flow controller 600 includes terminals 606a, 606b for applying power to one or more SMA elements. As is shown, a first terminal 606a is mechanically and electrically connected to one end of SMA element 610, where the other end of SMA element 610 is mechanically and electrically connected to attachment anchor 608. SMA element 612 is configured in a similar manner as is SMA element 610. Attachment anchor 608 provides a conductive path as well as a structure for receiving end portions of SMA elements 610, 612 so they can actuate under power. In some embodiments, attachment anchor 608 includes one or more channels through which an SMA element extends from one of terminal 606a, 606b via the channel in attachment anchor 608 to the other of terminals 606a, 606b. Also, terminals 606a, 606b can be formed as crimps. In one embodiment, terminals 606a, 606b and attachment anchor 608 are mechanically secured to duct housing 602. In a specific embodiment, a lever-type structure 614 is implemented within (or without) shaft 620 to convert forces generated by contracting SMA elements 610, 612 into rotational motion about axis 601.

Figure 7A:
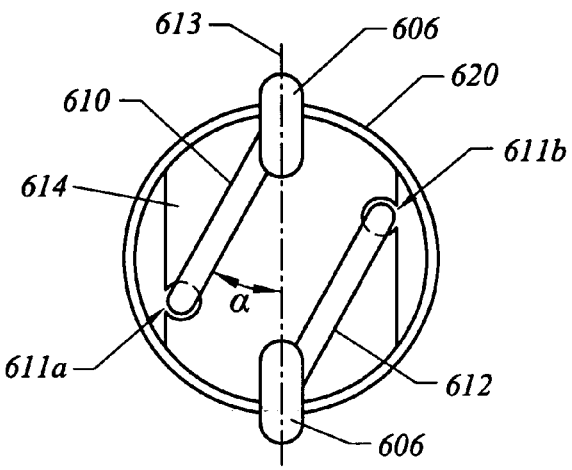
FIGS. 7A–7C respectively depict an end view, a side view and a perspective view of an exemplary configuration of one or more SMA elements in shaft 620 of FIG. 6, according to an embodiment of the present invention.
Figure 7B:
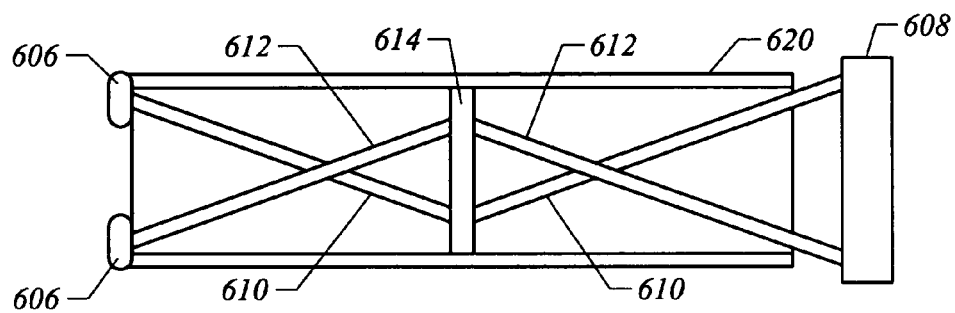
Figure 7C:
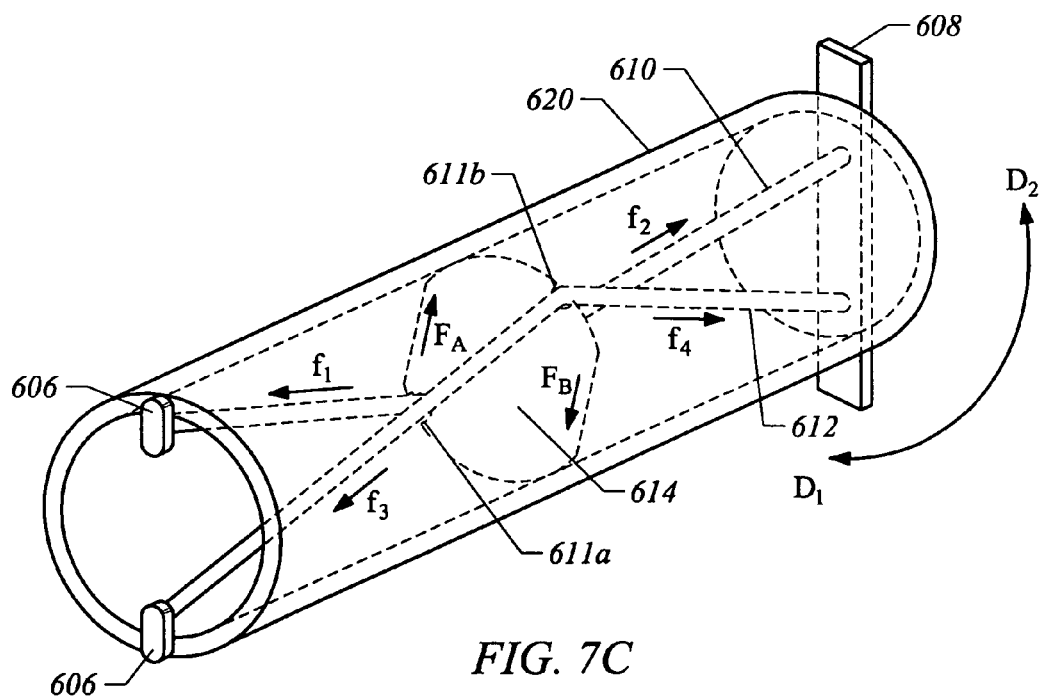

FIGS. 7A–7C respectively depict an end view, a side view and a perspective view of an exemplary configuration of one or more SMA elements in shaft 620 of FIG. 6, according to an embodiment of the present invention. As is shown in FIGS. 7A and 7B, SMA elements 610 and 612 each extend from terminals 606a and 606b, respectively, via lever-type structure 614 to attachment anchor 608. In particular, SMA element 610 traverses and contacts lever-type structure 614 at conversion point 611a and SMA element 612 traverses and contacts lever-type structure 614 at conversion point 611b. In particular, a corresponding point along each of SMA elements 610 and 612 contacts a conversion point at which to convert a contraction force into a rotational force. As is shown, conversion points 611a and 611b are offset at an angle α from a plane 613 passing through shaft 620, whereby the offset enables the conversion of forces generated by the contractions of SMA elements 610, 612 into a torque about axis 601. One having ordinary skill in the art should recognize that the placements of conversion points 611a and 611b can be readily determined for any particular application. In another embodiment, conversion points 611a and 611b are located directly on the interior surface of shaft 620 rather than lever-type structure 614.

FIG. 7C illustrates the conversion of SMA contraction forces into rotational forces, according to a specific embodiment of the present invention. For instance, consider that FIGS. 7A and 7B depict SMA elements 610 and 612 before application of current, and therefore, prior to contraction. In this state, the rotational flap of FIG. 6 is in the fully open position. As shown in FIG. 7C, power and ground can be applied respectively to a first terminal 606*a* and a second terminal 606*b*, thereby heating respective SMA elements 610 and 612 so as to contract each element. As SMA elements 610, 612 contract, the rotational flap rotates clockwise (i.e., direction "D1") to the closed position. For example, when an amount of current passes through SMA elements 610 and 612, that amount of current generates contraction forces f1 and f2 and f3 and f4 acting upon conversion points 611*a* and 611*b*, respectively. So in this configuration, contraction forces f1 and f2 generate rotating force FA and contraction forces f3 and f4 generate rotating force FB. By varying the amount of power provided to the SMA elements, the amount of SMA contraction is controlled so as to vary the rotational flap into any flap position about the axis of rotation.

In alternative embodiments, other lever-type structures can be employed as force multipliers by providing additional SMA element attachment points (i.e., additional conversion points) to increase the application of localized force, for example, when a tight seal is desired by the rotational flap in the fully closed state. In one embodiment, one of flap members 604*a* or 604*b* is absent, with the other flap member extending to an area sufficient to block flow through duct housing 602. In this case, shaft 602 is located at one end of the existing flap member. Alternative embodiments are envisioned with various runs of SMA elements. In at least one embodiment, two or more wires are provided in pairs (e.g., same direction of rotation, but each pair of conversion points is located on opposite portions of the interior of a shaft) to advantageously limit friction when the shaft pivots. In one specific embodiment, the SMA actuator of the present invention provides ninety degrees or more of axle rotation.

Figure 8:
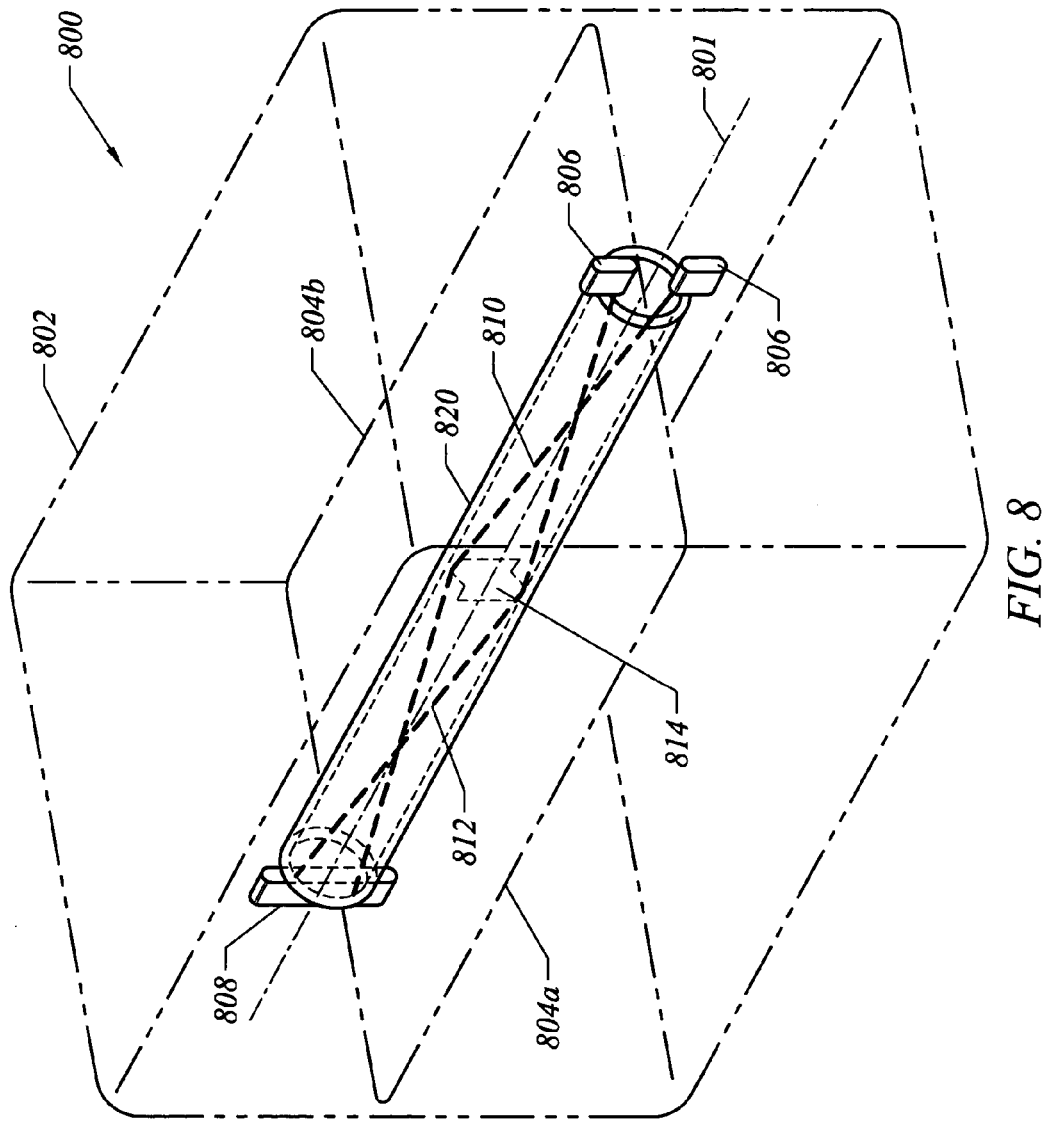
FIG. 8 depicts an SMA-actuated flow controller according to an embodiment of the present invention.

FIG. 8 depicts another perspective view of SMA-actuated flow controller 600 according to an embodiment of the present invention. SMA-actuated flow controller 800 includes one or more SMA elements disposed within a shaft 820 in a flap composed of flap member 804*a* and flap member 804*b*. Duct housing 802 is configured to include an integrated SMA-actuated flow controller 800, thereby providing support for shaft 820, terminals 806 and attachment anchor 808. In operation, the rotatable flap rotates about axis 801 by a degree determined by an amount of rotational force developed by one or more SMA elements located, in this instance, within shaft 820. As is shown in FIG. 8, the rotatable flap is in a fully open state. But when the one or more SMA elements 810, 812 are actuated, then the rotatable flap can close fully such that the flap is orthogonal to a flow passing through the duct, thereby minimizing or ceasing flow. And to open a rotatable flap from a closed state, FIGS. 9A–9C shows another set of one or more SMA elements operate to oppose the one or more SMA elements 810, 812.

In one embodiment, a return force (i.e., a restoring force), such as an antagonistic actuator, a torsion spring or like other mechanisms (not shown) can be implemented to return flap members 804*a* and 804*b* to their initial position. For example, a torsion spring (not shown) can be used to oppose the cumulative contraction forces of the SMA elements, thereby returning the rotational flap to its initial position. As such, the torsion spring operates as a bias against SMA-actuated direction of rotation. In an alternative embodiment, SMA elements remain powered to hold the rotational flap in a desired position. In another embodiment, additional one or more SMA elements are provided to oppose a set of SMA elements disposed within the shaft. The opposing SMA elements are arranged in an antagonistic arrangement either inside or outside the shaft, or both.

Figure 9A:
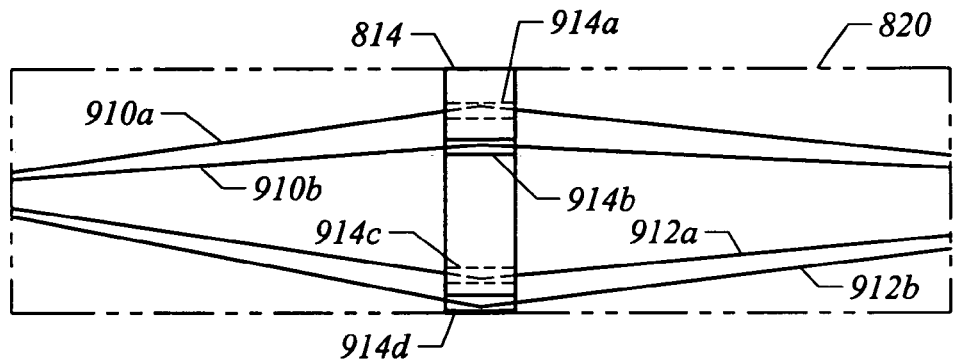
FIGS. 9A–9C respectively depict a side view of shaft 820 of FIG. 8, as well as a first perspective view showing one set of SMA elements and a second perspective view showing another set of antagonistic SMA elements, according to an embodiment of the present invention.
Figure 9B:
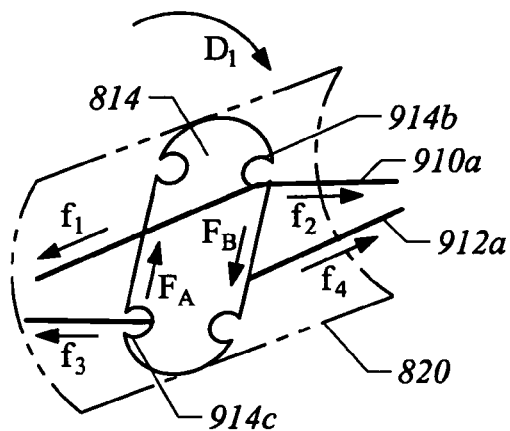
Figure 9C:
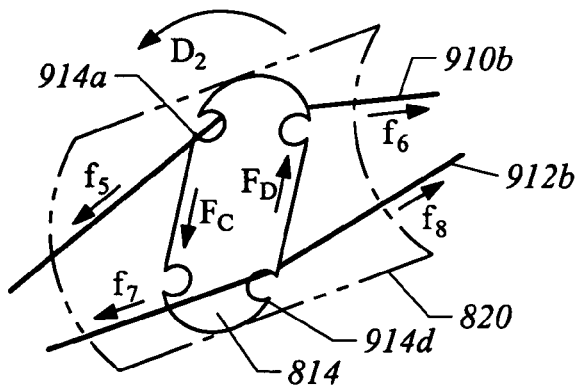

An exemplary implementation of antagonistic SMA elements in SMA-actuated flow controller 800, according to a specific embodiment of the present invention, is discussed in FIGS. 9A–9C. SMA-actuated flow controller 800 of FIG. 9A has one set of SMA elements configured to open the rotatable flap (not shown), and another set of SMA elements configured to act in opposition to the first set to close the flap. One advantage of using opposing SMA elements is that any temperature variation within shaft 820 caused by the operation of the surrounding ventilation system, for example, will cancel out. This occurs because both sets of SMA elements likely have the same response to external thermal variations. So, with SMA elements configured in an antagonistic arrangement, contractions in SMA elements due to external thermal variation will cancel.

In particular, FIGS. 9A–9C respectively depict a side view of shaft 820 of FIG. 8, as well as a first perspective view showing one set of SMA elements and a second perspective view showing another set of antagonistic SMA elements, according to an embodiment of the present invention. FIG. 9A shows shaft 820 with one set of SMA elements 910*a* and 912*a* configured to rotate shaft 820 in the D1 direction, which is indicated in FIG. 9B, and another set of SMA elements 910*b* and 912*b* configured to rotate shaft 820 in the D2 direction, which is indicated in FIG. 9C. FIG. 9B illustrates an instance where SMA elements 910*a* and 912*a* are heated, thereby respectively generating contraction forces f1 and f2 and contraction forces f3 and f4. In particular, contraction forces f1 and f2 applied to conversion point 914*b* create rotating force FB, whereas contraction forces f3 and f4 applied to conversion point 914*c* create rotating force FA. In turn, rotating forces FA and FB cause shaft 820 to rotate in the D1 direction. Note that the opposing set of SMA elements, which are described next, have been omitted from FIG. 9B for purposes of clarity. FIG. 9C illustrates another instance when SMA elements 910*b* and 912*b* are heated, thereby respectively generating contraction forces f5 and f6 and contraction forces f7 and f8 at corresponding points along each SMA element. In particular, contraction forces f5 and f6 applied to conversion point 914*a* create rotating force FC, whereas contraction forces f7 and f8 applied to conversion point 914*d* create rotating force FD. Consequently, rotating forces FC and FD cause shaft 820 to rotate in the D2 direction.

Figure 10:
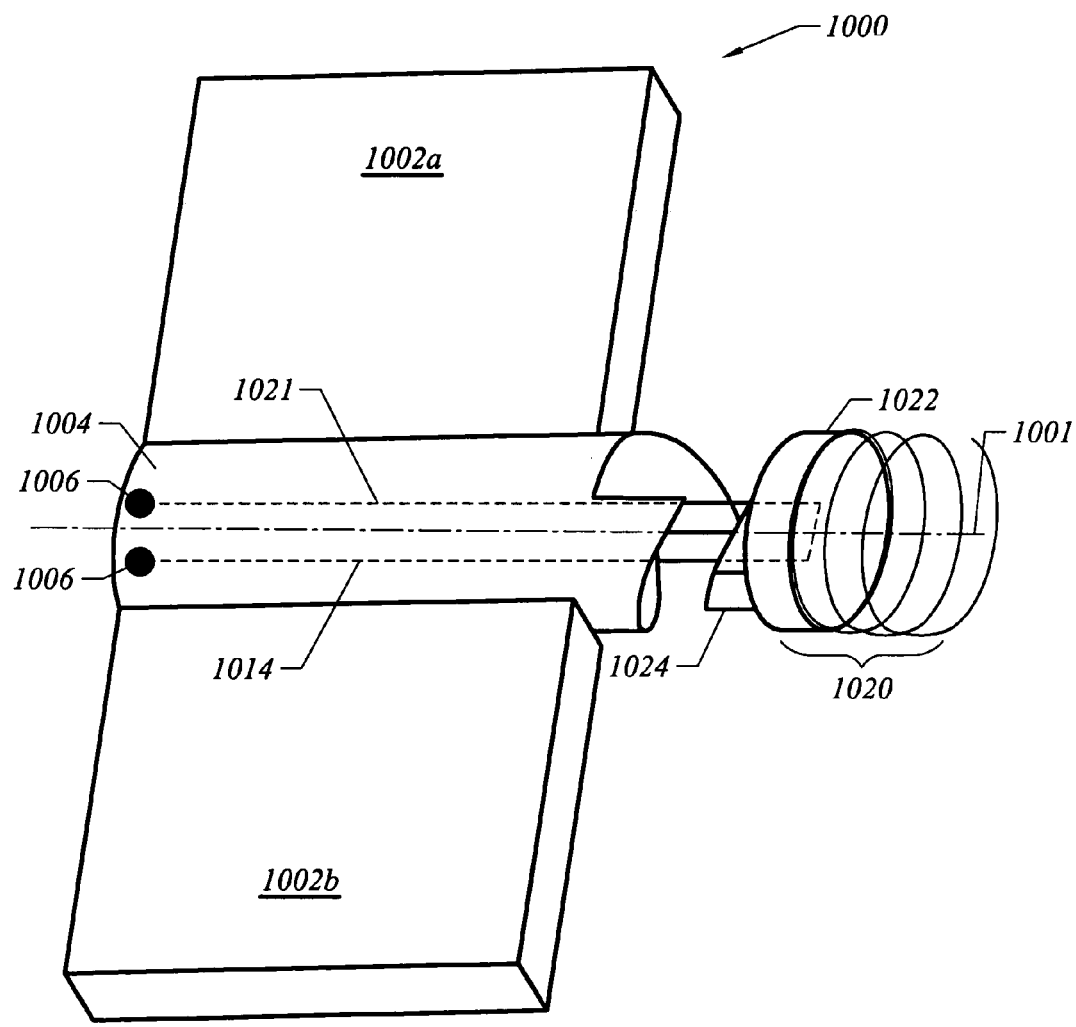
FIG. 10 illustrates an additional exemplary SMA-actuated flow controller configured to generate rotational motion about an axis of rotation, according to one embodiment of the present invention.
Figure 11:
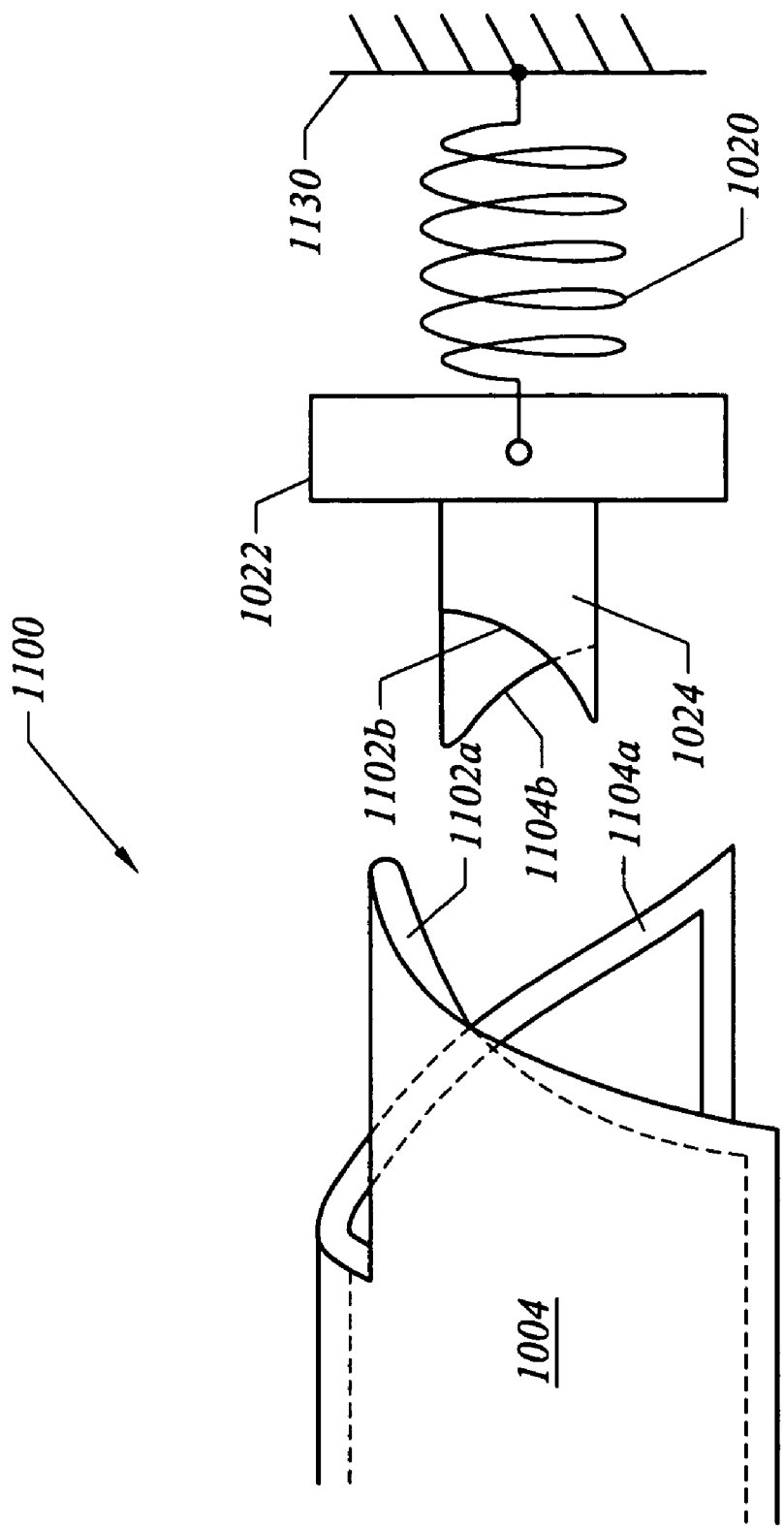
FIG. 11 illustrates an example of a complementary set of helical faces for converting translation motion into rotation motion, according to one embodiment of the present invention.

FIGS. 10–11 illustrate additional exemplary SMA-actuated flow controllers configured to generate rotational motion about an axis of rotation, according to an embodiment of the present invention. For example, FIG. 10 is an exploded view depicting SMA-actuated flow controller 1000 having at least one SMA actuator disposed within a rotatable member, such as shaft 1004. As shown, SMA-actuated flow controller 1000 includes at least one SMA element disposed within a shaft 1004 in a flap composed of flap member 1002*a* and flap member 1002*b*, thereby forming a rotatable flap. This enables SMA-actuated flow controller 1000 to achieve a relatively compact flow control mechanism by integrating its actuator within its structure.

In this example, one end of shaft 1004 is adapted to receive a translator interface 1024 of a translation drive member 1022, which causes translation movement of drive member 1022 to be transformed into rotation motion about axis 1001. In operation, the rotatable flap rotates about axis 1001 by a degree determined by an amount of rotational force developed by the at least one SMA element composed of portions 1012 and 1014 within shaft 1004, where portions 1012 and 1014 can be portions of a single SMA element or can be separate SMA elements. In the example shown in FIG. 10, the SMA element is an SMA wire having one end connected to a first power terminal 1006 and another end connected to a second power terminal 1006, where the central portion is coupled to drive member 1022. As the SMA element contracts, translator interface 1024 of drive member 1022 moves into shaft 1004, the movement of which stores a restoring force in a spring 1020. Spring 1020 is affixed to an immovable surface 1130.

In one embodiment, translator interface 1024 is a ramped engagement device having, for example, a helically-shaped interface that complements a similarly shaped ramp formed as an interface for shaft 1004. These complementary helical faces are used to translate linear forces generated by SMA actuation (e.g., SMA element contraction) into rotational forces that act upon the rotational flap. FIG. 11 illustrates an exemplary translator interface 1024 configured to mate with a complimentary interface on shaft 1004. A more detailed description of SMA-actuated flow controller 1000 is discussed next.

As shown in FIG. 11, a complementary set of helical faces are formed into translator interface 1024 positioned in mating relationship near the helical end (i.e., interface) of shaft 1004. In particular, a first helical surface 1102b and a second helical surface 1104b on translator interface 1024 are configured to respectively engage a first helical surface 1102a and a second helical surface 1104a on shaft 1004 for converting translation motion into rotation motion. Note that although shaft 1004 and translator interface 1024 are shown to each have two helical ramps, any number of (or kinds of) ramps are within the scope and the spirit of the present invention.

Returning to FIG. 10, the center of the SMA wire is attached to an appropriately-fashioned mechanical connection (e.g., a hook or a crimp) near the center of the helically-shaped face of drive member 1022. In operation, the traction exerted by the SMA wire, when energized, is partially counteracted by the elastic energy of a preloaded, spiral-wound extension spring 1020 that resiliently supports drive member 1022 within an axial-guiding channel (not shown). This guiding channel allows the drive member 1022 to move axially under the influence of the contracting SMA wire, but the channel is configured to prevent rotation of drive member 1022. This way, inbound axial movement of the drive member 1022 forces relative sliding motion of the two sets of helical surfaces (surfaces 1102b and 1104b as a first set, and surfaces 1102a and 1104a as a second set), including a controlled rotation of the rotational flap. In some embodiments, the work of extension spring 1020 is conveniently augmented by a torsion spring (not shown) coupled between the rotational flap and one or more fixed surfaces to return the rotational flap to the original position when the SMA element is not powered.

In some embodiments, the angular position of the flap may remain under the control of a powered SMA actuator as described above, if power is readily available to maintain that position. In this case, the resulting angle of the flap will depend on an instantaneous contraction level of the SMA actuator. The SMA actuated flap of FIG. 10 may operate under feedback control of an overall ventilation control system (not shown), such that the SMA actuator will remain activated for extended periods at variable flap positions determined by the control system.

In alternative embodiments, the complementary helical faces of FIG. 11 can be advantageously designed to accommodate multiple stable states. As such, changing from one such state to another involves cycling the SMA actuator. For example, helical faces of FIG. 11 can be modified so that 4 flap states exist. The flap states of "fully closed," "one-third open," "two-thirds open," and "fully open" then would be rendered by the appropriately designed complementary helical faces. So, at an initial condition, the SMA element is not powered. This means that the flap is in the fully closed position. If the SMA element is actuated once, the helical faces advance to place the flap in the one-third open position. Actuating the SMA element again indexes the flap to a two-thirds open position. One last actuation of the SMA element advances the flap to a fully open position. Numerous combinations of flap positions are possible and may be designed with the appropriate helical face. Additionally, an ordinarily skilled artisan should appreciate that while helical faces are described, any of a number or types of complementary faces may be used to achieve the advantages of the invention.

The foregoing description, for purposes of explanation, used specific nomenclature to provide a thorough understanding of the invention. However, it will be apparent to one skilled in the art that specific details are not required in order to practice the invention. For example, the teachings of this disclosure can be applied so as to control the direction of flow rather than just a volume passing through an aperture. As another example, consider that the exemplary actuators described above in the context of controlling the flow of air or light may be used in other, unrelated applications. In particular, these exemplary actuators maybe implemented with or without the presence of flaps, louvers, slats, dampers, or the like without departing from the scope and spirit of the present application. As such, an improved rotatable actuator is described herein. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A shape memory alloy-actuated flow controller, comprising:
 a rotatable flap having a shaft along an axis about which said rotatable flap rotates; and an actuator disposed within said shaft and configured to generate a force causing said rotatable flap to rotate, said actuator comprising a shape memory alloy ("SMA") actuator including a number of SMA elements.

2. The SMA-actuated flow controller of claim 1, further comprising a duct housing configured to support said rotatable flap, said duct housing adaptable for disposition in a duct of a ventilation system.

3. The SMA-actuated flow controller of claim 1, wherein each of said number of SMA elements contact a corresponding point at which to generate a rotating force in a first direction of rotation when said number of SMA elements are actuated.

4. The SMA-actuated flow controller of claim 3, wherein said corresponding point is positioned on a lever-type structure affixed to said shaft.

5. The SMA-actuated flow controller of claim 1, further comprising a restoring mechanism configured to restore said rotatable flap to a certain position when none of said number of SMA elements are actuated.

6. The SMA-actuated flow controller of claim 5, wherein said restoring mechanism is a spring configured to store energy for restoring said rotatable flap to said certain position.

7. The SMA-actuated flow controller of claim 5, wherein said restoring mechanism is another SMA actuator including another number of SMA elements, said another SMA actuator disposed within said shaft and configured in an antagonistic arrangement with said SMA actuator, said another number of SMA elements providing temperature compensation for said number of SMA elements.

8. The SMA-actuated flow controller of claim 7, wherein each of said another number of SMA elements contact a corresponding point at which to generate an amount of rotating force in a second direction of rotation when said another number of SMA elements are actuated.

9. The SMA-actuated flow controller of claim 1, wherein said shaft has an end including an interface configured to receive a translator interface.

10. The SMA-actuated flow controller of claim 9, further comprising a drive member including said translator interface; and a restoring spring coupled to said drive member.

11. The SMA-actuated flow controller of claim 10, wherein said interface and said translator interface are helically-shaped and configured to convert an axial force generated by said drive member translating along said axis into a rotational force applied to said shaft, said axial force caused by the contraction of at least one SMA element.

12. A shape memory alloy-actuated aperture controller, comprising:

a rotatable member having a shaft along an axis about which said rotatable member rotates, said rotatable member configured to vary a size of an aperture; and an actuator disposed within said shaft and configured to generate a force causing said rotatable member to rotate, said actuator comprising a shape memory alloy ("SMA") actuator including a number of SMA elements.

13. The SMA-actuated flow controller of claim 12, further comprising a housing configured to support said rotatable member, said housing adaptable for disposition in series with a passage.

14. The SMA-actuated flow controller of claim 12, wherein each of said number of SMA elements contact a corresponding point at which to generate an amount of rotating force in a first direction of rotation when said number of SMA elements are actuated.

* * * * *